Sept. 17, 1929.  C. L. DE NUNE  1,728,399
WIRELESS SEED PLANTER
Filed Aug. 19, 1927  2 Sheets-Sheet 1

Inventor
CLARENCE L. DeNUNE

Sept. 17, 1929.  C. L. DE NUNE  1,728,399
WIRELESS SEED PLANTER
Filed Aug. 19, 1927  2 Sheets-Sheet 2
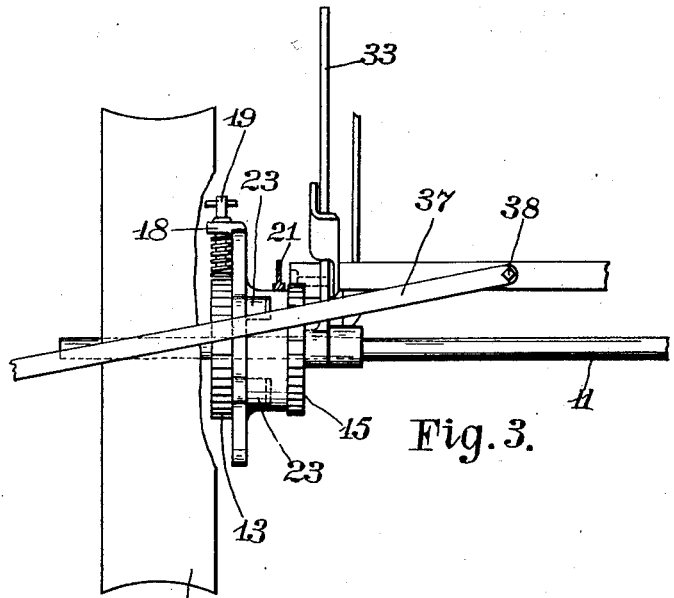
Fig. 3.
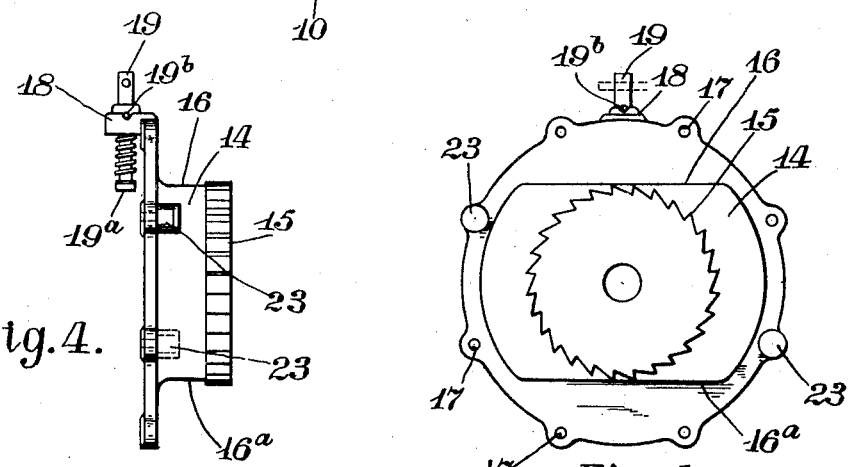
Fig. 4.
Fig. 5.
Inventor
CLARENCE L. DE NUNE
his Attorneys Patented Sept. 17, 1929

1,728,399

UNITED STATES PATENT OFFICE

CLARENCE L. DE NUNE, OF MIFFIN TOWNSHIP, FRANKLIN COUNTY, OHIO

WIRELESS SEED PLANTER

Application filed August 19, 1927. Serial No. 214,195.

For economic reasons fields of maize or corn are planted in checkerboard fashion, the hills occurring at the corners of the imaginary squares, the sides of which are usually about forty two inches in length. To produce this effect corn planters are now generally provided with a check-rower consisting of a suitable length of wire having equally spaced lugs thereon stretched across the field, the lugs serving to actuate the seed release at the proper regular intervals. The shifting of this wire as the work of planting proceeds involves much labor and consumes much valuable time. Corn planters operating to regularly plant the seed without the use of a wire checkrower have been proposed but as far as I am aware they have not come extensively, if at all, into use for the reason perhaps that they have not been provided with means for conveniently making the hills aline at right angles transversely as respects the first row.

The object of the present invention, therefore, is principally to provide an improved seed planter in which such alinement is effected without trouble or much loss of time. Another object is to provide a marker for locating the hills. Other objects will appear from the description.

The invention is embodied in the example herein shown and described.

In the accompanying drawings—

Fig. 3 is a view looking at the rear of the machine with parts broken out or omitted.

Fig. 4 is a detail in edge view, on a larger scale, than in the preceding view, of the cam drum for actuating the seed release and hill marker.

Fig. 5 is a view of the inner or right hand side of the drum as shown in Fig. 4.

Figure 1:
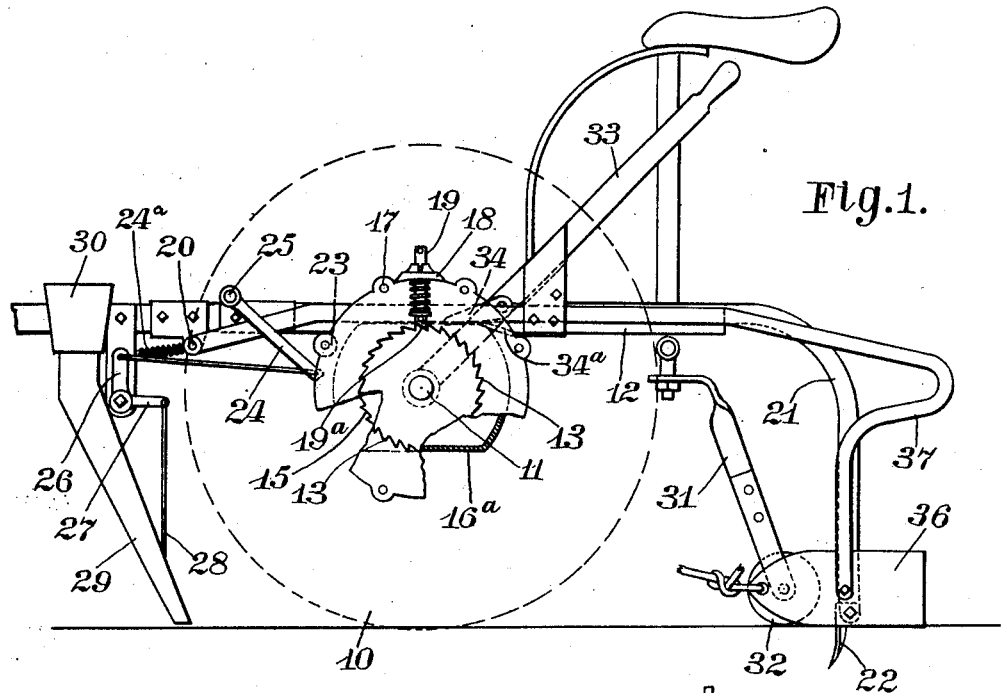
Figure 1 is a view in side elevation of a machine partly broken out and with parts omitted containing my invention.
Figure 2:
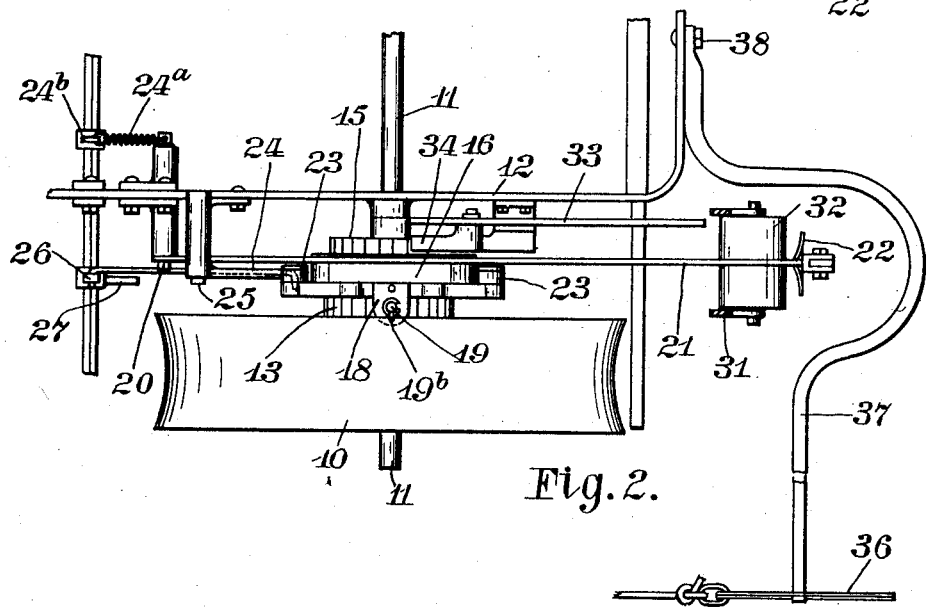
Fig. 2 is a top plan view of the same.

In the views 10 designates the left hand one of the two usual ground wheels and 11 the axle which turns with said wheel. Fast on said axle next the frame 12 of the machine is a ratchet wheel 13 having its teeth pointing anti-clockwise or forward of the machine at the top. Loosely journaled on the axle is a drum 14 (see Figs. 4 and 5) having fixed thereon a ratchet wheel 15 with its teeth pointing clock-wise and rearward at the top, two straight cams 16, and $16^a$ parallel to each other on the rim, and a series of eight left hand threaded holes 17 around its flange. Cast at one point of the flange of the drum is a bracket 18 in which is slidingly mounted a pin 19 having a pawl $19^a$ pressed by a coil spring to engage the pawl with a tooth of the ratchet 13 so that when the machine is drawn forward the drum 14 is turned with the ratchet 13. The pin 19 has at its upper end a cross pin $19^b$ by which said pin 19 can be raised to remove the pawl from the teeth of the ratchet and when so raised given a quarter turn to hold it removed by the resting of the cross pin on the bracket or in a notch therein.

Pivoted at 20 to a clip on the frame forward of the axle by means of a removable bolt is an arm 21 having at its rear end a tool or ground marking member 22. The arm 21 lies above the path of the cams 16 and $16^a$ so that as the drum turns those cams cause and permit the tool 22 to rise and then fall by gravity twice for each revolution of the drum and carrying wheels. It will be observed that because the cam surfaces 16 and $16^a$ are planes on chords parallel to each other with cylindrical arcs between them having for their center the axle of the vehicle the arms 21 are dropped and removed from the soil almost in an instant thereby avoiding dragging the hill marker 22 in the soil and insuring a sharply defined mark. The parts are proportioned so that the tool is dropped to penetrate the ground and so leave a mark thereon at points equal to the desired spacing of the hills in a row. Thus if the hills are to be spaced forty-two inches apart in the row, as in the example, the carrying wheel would have a circumference of eighty-four inches.

To render conspicuous the mark made by the tool 22 there is removably mounted in the frame an arm 31 carrying at its lower end a roller 32 located in advance of said tool, the roller having the effect of smoothing the ground where it is to be marked.

When corn is to be planted with the machine two diametrically opposite threaded holes 17 are provided with laterally projecting rollered pins 23 threaded into said holes. When the drum is rotated by the forward movement of the machine these pins strike in succession an arm 24 pivoted at 25 on the frame forward of the drum, said arm being linked to one arm 26 of a bell-crank lever, the other arm 27 of said lever having attached thereto a rod 28 to operate an ordinary seed release (not shown) in the spout 29 of the seed box 30. A spring 24$^a$ connected to an arm 24$^b$ on the bell-crank lever shaft and a fixed point on the frame can be employed to hold the arm 24 and the seed release rod 28 in the down or closed position. When wheat or other like small grain is to be drilled all of the holes 17 are provided with the rollered pins 23 and the arm 21 with its marker 22 removed by taking out the bolt at 20, such marker not being useful but rather an incumbrance when small seed, such as wheat, is being drilled. The roller 32 can also be removed for the same reason when small seed is being drilled.

Suitably swinging on the axis of the axle is a hand lever 33 carrying a pawl 34 pivoted thereto adapted to be brought into engagement with the ratchet wheel 15. By repeated oscillations of the hand lever 33 the drum can be rotated anti-clockwise to the extent desired; and when not being operated in this way the pawl 34 can be kept out of clicking engagement with the ratchet by a stationary pawl lifter 34$^a$ on the frame effective when the hand lever is swung rearward to its normal resting place.

It will be frequently the case that when the end of a row has been reached and the vehicle turned around it will be necessary to back the machine to cause it to stand with the seed spout above the first hill point in the new row to aline at right angles with the last hill point of the preceding row; backing the machine in such a case might disturb the necessary relation of the seed release actuating pins 23 to the arm 24 hence with said hand lever 33 the driver can advance the drum to cause the ratchet pin 23 to actuate the arm 24 at just the proper moment for the first hill of the new row after which the correct planting proceeds in the new line, the seed being dropped at intervals to effect a coinciding location with the hills of the next previous row and each in the desired transverse line.

In connection with the hill marker there may also be employed in the machine the usual line marker consisting of a blade 36 connected with the free end of an arm 37 pivoted at 38 to the middle of the rear of the frame of the machine. This marker can be swung over to either side of the machine and the line in the ground made by it serves as a guide, as usual, for the driver in driving the machine.

The forms of the parts can be changed without departing from the gist of the invention as claimed, it being understood that where any particular terms employed in the claims they are intended to include mechanical equivalents if the prior art justifies.

What I claim is:

1. In a seed planter, a frame, an axle on the frame having secured thereon a carrier wheel, and a land marker including a movable arm carrying a hill marking tool, means for oscillating said arm consisting of a drum adjustably fixed to said axle, said drum having parallel cam surfaces, said surfaces formed on chords of a circle at opposite sides of its axis of rotation with cylindrical surfaces connecting the ends of said surfaces having for their center the axle of the vehicle.

2. In a seed planter, a frame, an axle on the frame having secured thereon a carrier wheel, and a hill marker including a movable arm carrying the marking tool, means for actuating said arm consisting of a drum adjustably fixed to said axle, said drum having a cam surface that is formed on a chord of a circle with cylindrical surfaces beyond the terminals thereof, said cylindrical surfaces having for their axis the axis of rotation of the wheel.

3. In a seed planter, a frame, an axle on the frame having secured thereon a carrier wheel, and a hill marker including a movable arm carrying the marking tool, a drum for periodically operating said arm having a cam surface that is formed on a chord of a circle with cylindrical surfaces beyond the terminals thereof, a seed releasing means, and means carried by said drum for actuating said seed releasing means substantially simultaneously with the functioning of the hill marker.

4. In a seed planter, a frame, an axle on the frame having secured thereon a carrier wheel, a hill marker including a movable arm carrying the marking tool, means for actuating said arm and tool consisting of a drum adjustably fixed to said axle, said drum having a cam surface that is formed on a chord of a circle with cylindrical surfaces beyond the terminals thereof and having for their axis the axle of the vehicle, a seed releasing means, and means carried by the drum for actuating the seed releasing means substantially simultaneously with the functioning of the hill marking means.

5. In a seed planter having a frame, an axle in the frame having secured thereon a carrier wheel, and a hill marker including a movable arm carrying the marking tool, a drum for periodically operating said drum having a cam surface that is formed on a chord of a circle with cylindrical surfaces beyond the same, a seed releasing means and means carried by said drum for actuating said seed releasing means substantially simultaneously with the functioning of the hill marker, and a land smoothing roller in advance of said marking tool.

6. In a seed planter having a frame, an axle in the frame having secured thereon a carrier wheel, and a hill marker including a movable arm carrying a marking tool in the rear of the frame, a drum for periodically operating said arm having a cam surface that is formed on a chord of a circle with cylindrical surfaces beyond the same, a seed releasing means in the forward part of the frame, means carried by said drum for actuating said seed releasing means substantially simultaneously with the functioning of the hill marker, and a land smoothing roller in advance of said marking tool.

CLARENCE L. DE NUNE.